Oct. 14, 1952   L. F. MILLER ET AL   2,613,409
MOLDING MACHINE AND METHOD OF MOLDING
Filed Sept. 13, 1948   5 Sheets—Sheet 3

INVENTORS
LEON F. MILLER AND
BY LYNDON C. COLE

Oberlin & Limbach
ATTORNEYS.

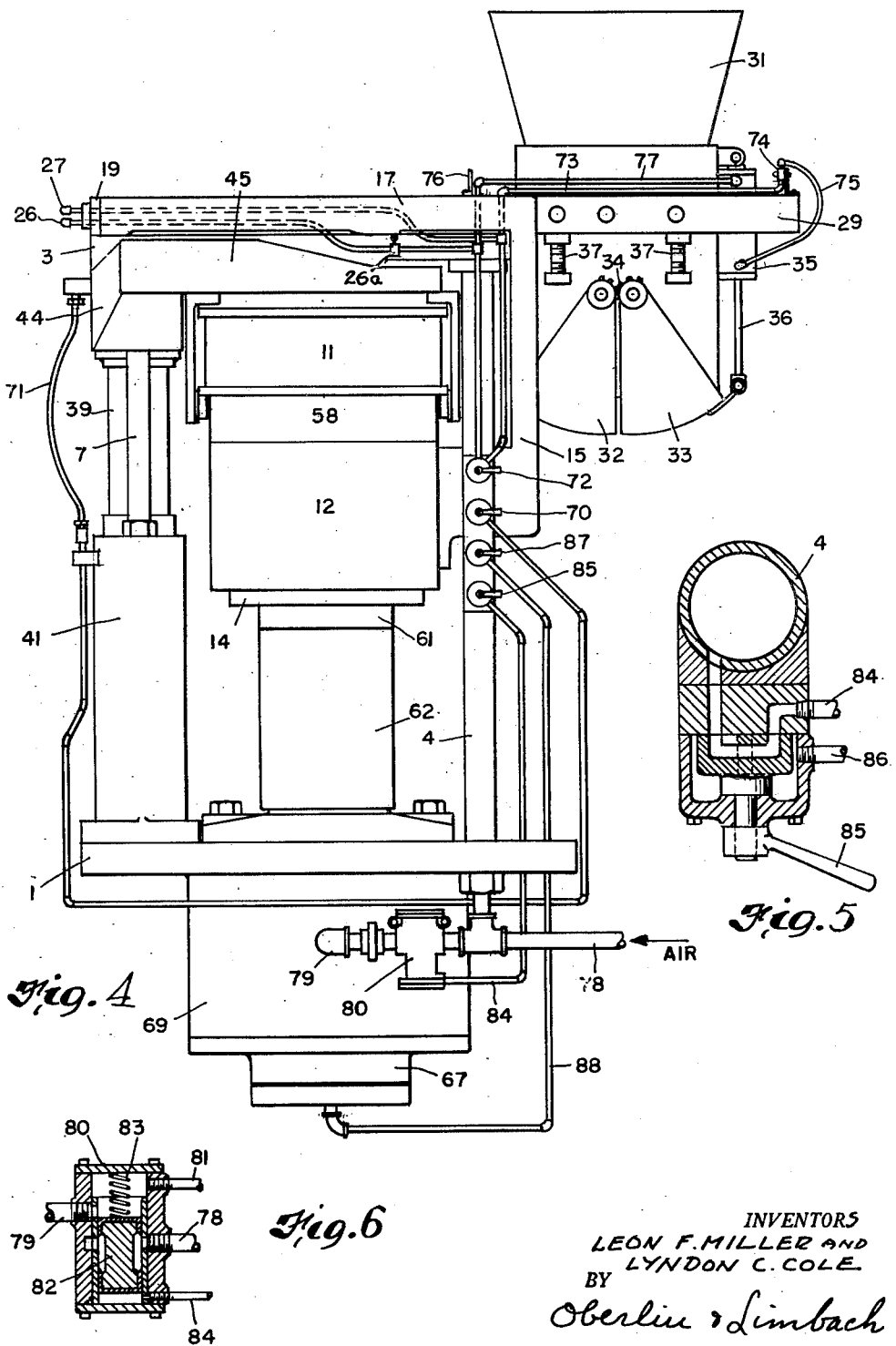

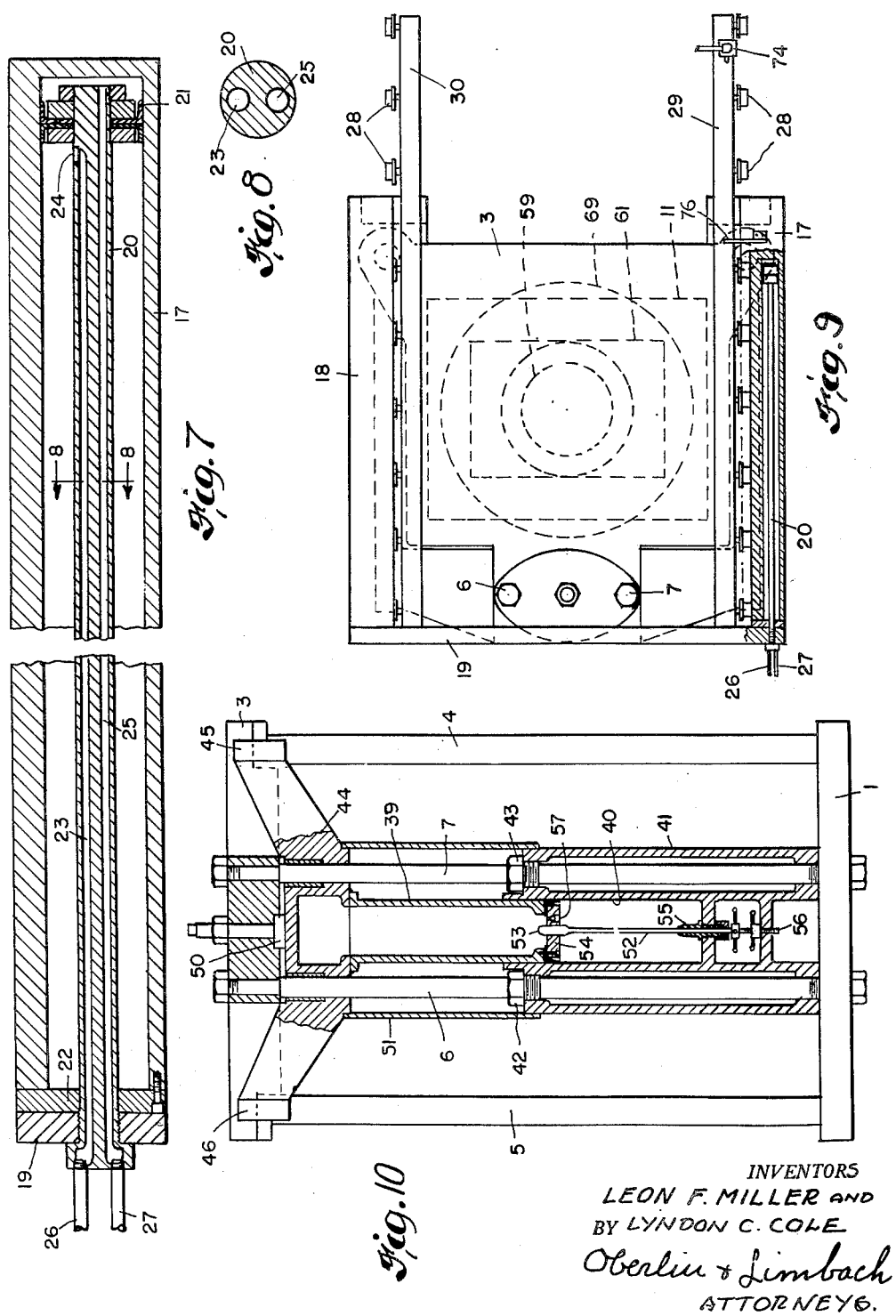

Patented Oct. 14, 1952

2,613,409

UNITED STATES PATENT OFFICE 2,613,409

MOLDING MACHINE AND METHOD OF MOLDING

Leon F. Miller, Fairview Village, and Lyndon C. Cole, Cleveland Heights, Ohio, assignors to The Osborn Manufacturing Company, Cleveland, Ohio, a corporation of Ohio Application September 13, 1948, Serial No. 49,064

18 Claims. (Cl. 22—36)

This invention relates as indicated to a new molding machine and method of molding and, more particularly, to a machine and method whereby suitable materials such as foundry molding sand may be formed into molds to be used in the production of iron, steel, malleable, and non-ferrous castings, and the like.

There are at the present time two principal types of machines and methods employed in the production of molds where a large number of identical molds are required. In one operation, the sand is rammed against the pattern by a combination of jolting and squeezing, and in the other a sand slinging device is employed to throw the sand into the flask, a small quantity at a time. A modified form of machine has also been employed in which both a blowing and squeezing action have been combined.

While each of these well-known methods involves certain features which are highly objectionable, nevertheless only minor changes have been made in the standard types of molding machines in recent years. One objection common to all molding operations as presently performed is the fact that the quality of the mold may vary decidedly depending upon the skill of the operator. A number of manual operations have generally been required, and since such work is generally performed on a piece-work basis there is a common tendency for the operator to adjust the machine for maximum production and regardless of quality.

Jolt squeeze ramming of the molding sand results in excessive wear and tear on both the machine and the pattern equipment necessitating an excessive degree of maintenance and making for very unsatisfactory working conditions. Where sand slinging equipment is employed, the pattern and other parts receiving the impact of the sand are subject to excessive abrasive wear and erosion. Certain parts of the sand slinger itself are also abraded very rapidly. Consequently, such equipment is in frequent need of replacement or repair. Not only does employment of the jolt impact method require the use of special heavy foundations and massive machine frames, but also the noise and vibration caused by such machines have helped to give the foundries a bad name as a place to work. The spilling and spraying of sand particles traveling at high speed when employing the sand slinger method are likewise objectionable from the point of view of both the operator and the maintenance personnel.

It is conventional to produce molds wherein the mold cavity opens downwardly, and this fact frequently causes considerable difficulty when the pattern is of such form that deep hanging pockets of sand result.

It is therefore a primary object of our invention to provide a novel method of molding whereby the foregoing difficulties may be substantially or entirely eliminated.

A further object is to provide a method and machine whereby a body of molding sand may be projected upwardly against a pattern to form the mold.

Another object is to project such body of sand at a speed and under such conditions that the same will enter the mold flask as a semifluid unit adapted to ram firmly and uniformly over all contours of the pattern with a lateral as well as axial flow, thereby permitting an extremely accurate reproduction of the pattern surface even where deep and complex shapes and contours are involved.

Another object is to provide a method and machine in which jolting and jarring are eliminated with resultant reduction in foundry maintenance cost and great improvement in working conditions.

Another object is to provide a method and machine whereby spilling and spraying of the molding sand is greatly reduced or eliminated with a corresponding reduction in maintenace and improvement in working conditions.

Another object is to provide a method and machine which will produce molds of very high quality without excessive abrasion and wear of the pattern equipment.

Still another object is to provide a method and machine which will not require a heavy foundation and massive frame to withstand the effect of operation.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 4 is a side elevational view of the machine similar to Fig. 2 but showing the arrangement of the pneumatic operating and control means;

Fig. 5 is a detail sectional view of one of the three-way valves of the type employed to control the ramming and drawing operation;

Fig. 6 is a sectional detail view taken along the line 6—6 on Fig. 4 of the quick-blow valve adapted to admit high pressure air for operation of the sand-projecting ram;

Fig. 7 is a sectional view of one of the sand magazine reciprocating cylinders taken along the line 7—7 on Fig. 2;

Fig. 8 is a sectional view through the piston of such cylinder along the line 8—8 on Fig. 7;

Fig. 9 is a top plan view of the head of the machine; and

Fig. 10 is a vertical sectional view of the draw cylinder which is operative to raise and lower the mold flask.

Figure 1:
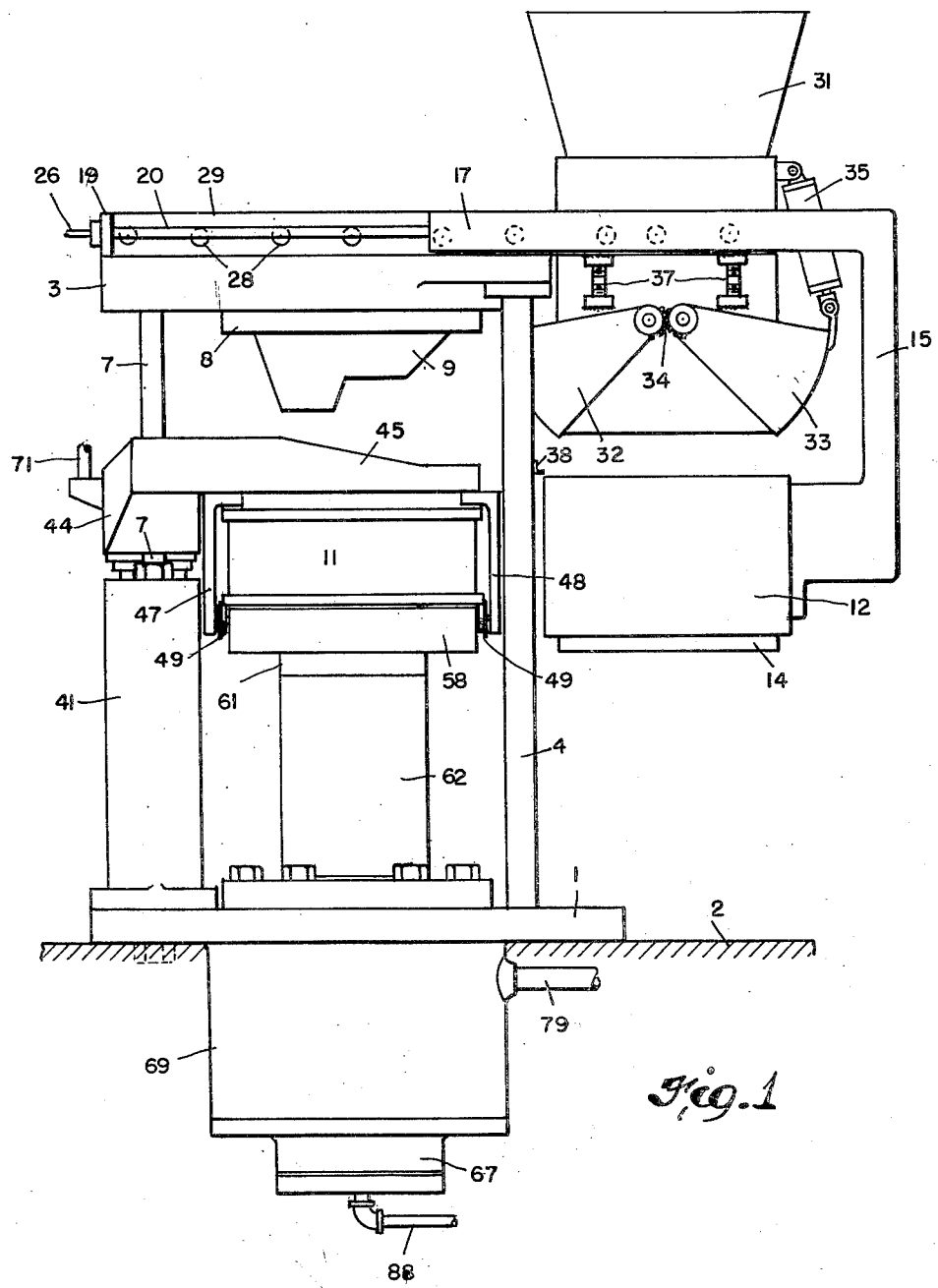
Fig. 1 is a side elevational view of a molding machine embodying the principles of our invention.
Figure 2:
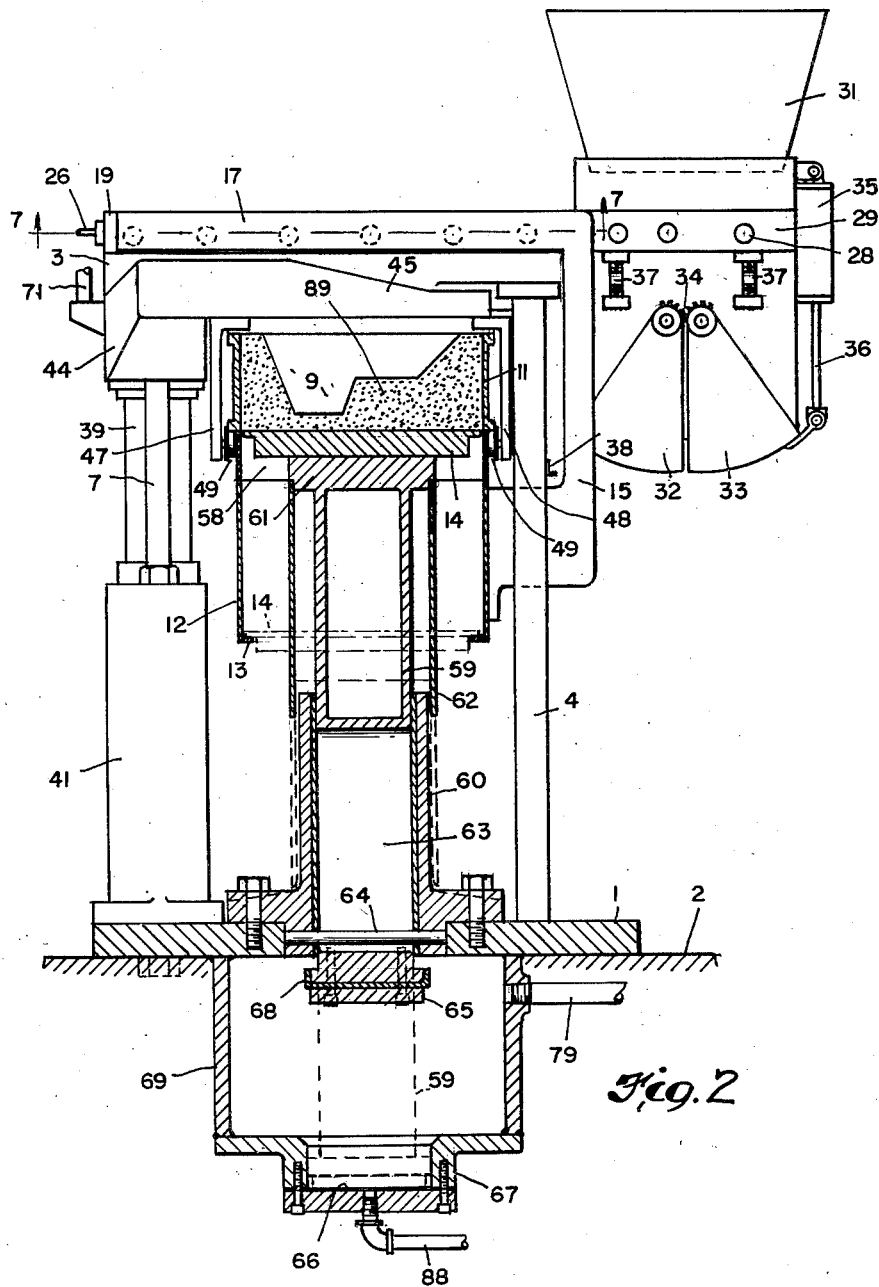
Fig. 2 is a side elevational view of such machine partly broken away to show the internal construction thereof and showing the positions of the parts during the actual molding operation.
Figure 3:
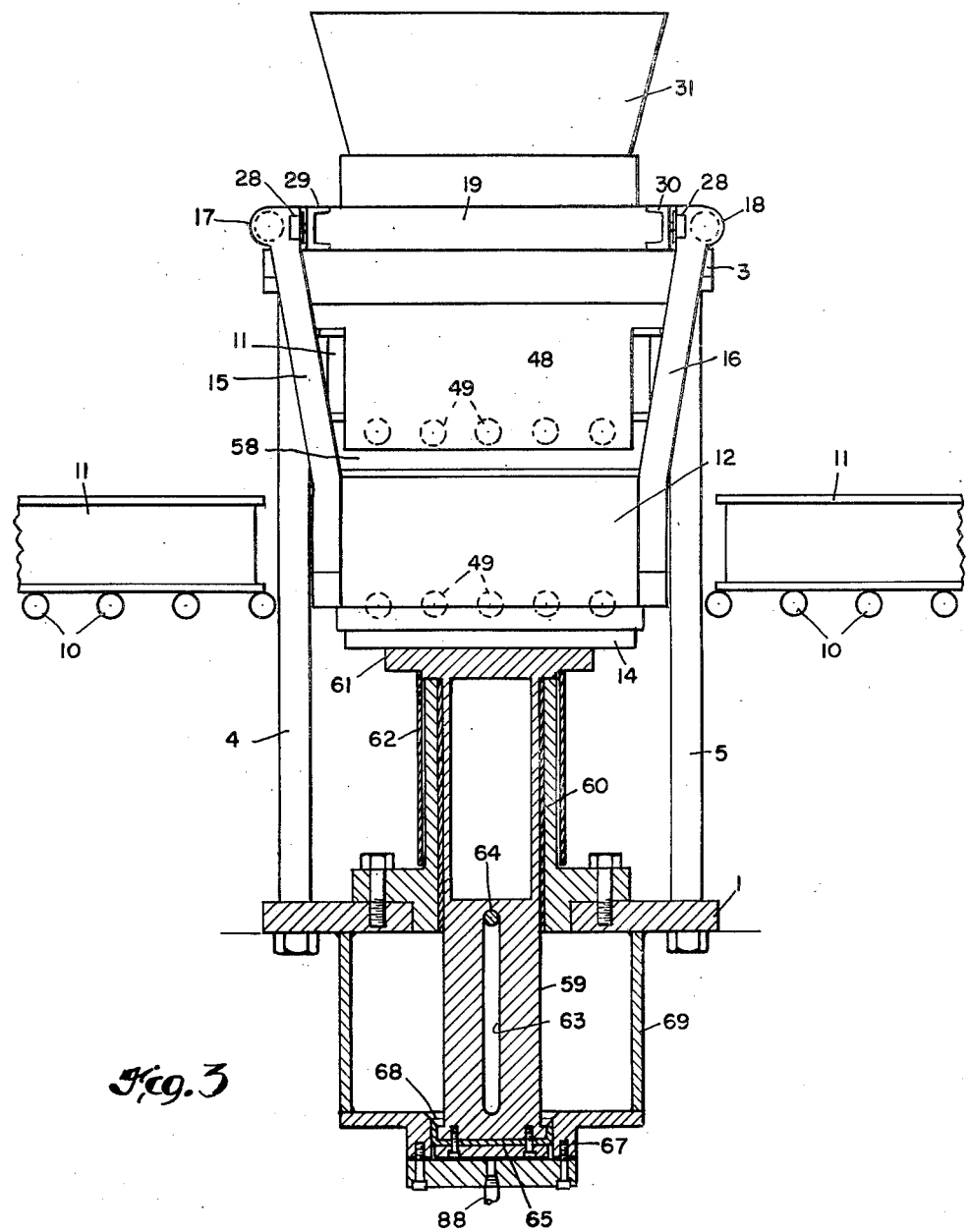
Fig. 3 is an end elevational view of the machine of Fig. 1 partly broken away to show the positions of the parts prior to the actual molding operation.

Referring now more particularly to such drawing and especially Figs. 1-3 thereof, the embodiment of our invention there illustrated comprises a base 1 adapted to rest upon the floor 2 or similar foundation and a head 3 carried by two tubular columns 4 and 5 and two strain rods 6 and 7, the latter also serving as guides for the draw mechanism. A pattern board 8 and pattern 9 are adapted to be secured to the underside of head 3 with such pattern projecting downwardly. As shown somewhat diagrammatically in Fig. 3, a roller conveyor 10 may desirably be provided to either side of the machine to facilitate the transportation of the mold flasks 11 to and from the latter.

The various mechanisms which are mounted upon the above-described frame for cooperative action wil now be individually described.

The sand magazine

The sand magazine comprises a generally rectangular box 12 open above and below but having a peripheral inturned flange 13 about its lower edge adapted to serve as a seat for an upwardly movable bottom 14. Instead of such flange, lugs or widely spaced cross rods may be employed for this purpose. Such magazine is carried by a pair of arms 15 and 16 depending from the ends of axially reciprocable cylinders 17 and 18 respectively horizontally mounted on the head of the machine (see Figs. 3 and 9).

A crossbar 19 fixedly secured to the head 3 of the machine supports the two pistons such as 20 with which the cylinders 17 and 18 are respectively provided, as best shown in Fig. 7. A piston head 21 is secured to the end of piston 20 to make a tight seal with the inner wall of the cylinder. The other end of the cylinder is closed by means of a cylinder head 22 through which the piston passes. The piston is provided with an internal longitudinal passage 23 communicating at 24 with the interior of the cylinder, and is also provided with another passage 25 which runs the entire length of the piston and opens into the end of the cylinder beyond the piston head. By admitting air under pressure to either of lines 26 and 27, it will be clear that the cylinder 17 will be caused to be reciprocated axially as desired.

Cylinders 17 and 18 are provided with flanges which rest on rollers 28 carried by beams 29 and 30 respectively supported by the head of the machine (see Figs. 1, 3, and 9). The ends of beams 29 and 30 project laterally of the machine and support the hopper 31 therebetween. The lower end of such hopper is closed by means of a clamshell gate of conventional design comprising two pivotally mounted members 32 and 33 intergeared at 34 for conjoint movement. A pneumatic cylinder 35 is pivotally mounted on the hopper with the end of piston 36 pivotally connected to gate member 33. Retraction of such piston within the cylinder will thus cause the gate to open as shown in Fig. 1, permitting molding sand to be discharged from the hopper into the magazine 12 positioned therebelow. The hopper is suspended between beams 29 and 30 by means of screws 37 having oppositely threaded ends engaged in brackets on such hopper and beams whereby the position of the hopper may be slightly vertically adjusted relative to the sand magazine. In Fig. 3 the lower hopper mechanism has been omitted to better show certain details of the draw frame.

A sand strike-off bar 38 extends between columns 4 and 5 to level and strike off excess sand from the top of magazine 12 as the latter moves from right to left as shown in Fig. 1.

The drawing mechanism

Particular reference may now be had to Figs. 1, 2, and 10 of the drawing which illustrate the drawing mechanism in different positions and detail. Such drawing mechanism comprises a hollow piston 39 vertically reciprocable within a cylinder 40. Such cylinder is contained within a casting 41 through which pass tie rods 6 and 7, and nuts 42 and 43 on such respective rods serve to secure such casting firmly to the base 1 of the machine.

A draw frame 44 is supported by the upper end of piston 39 and has two parallel laterally projecting arms 45 and 46 which extend inwardly over the base 1 of the machine. Depending from such arms are two side frame plates 47 and 48 carrying rollers 49 adapted to receive and support the flask 11 when the latter is moved into the machine from the conveyor 10 and piston 39 is in lowered position.

Since tie rods 6 and 7 pass through draw frame 44, they serve as guides for the latter. An adjustable stop 50 is provided in the underside of the main head 3 of the machine to engage the upper surface of frame 44 and limit upward movement of the latter. Stop 50 will, of course, be adjusted to permit the draw frame to raise the flask 11 into tight engagement with the under surface of pattern plate 8. A shield 51 may be provided, if desired, secured to the underside of frame 44 and enclosing piston 39 and tie rods 6 and 7 to prevent sand from entering the mechanism (Fig. 10).

In order to avoid undue jarring of the parts and to ensure a relatively slow and even draw of the finished mold, we employ a special regulatory device within the draw cylinder 40. This comprises a rod 52 having an enlarged upper end portion 53 which fits fairly closely in an orifice in piston head 54. The lower end of rod 52 passes through a seal 55 in the lower end of such cylinder and the terminal portion 56 of such rod is threadably engaged in casing 41 for axial adjustment thereof. A check valve 57 permits fluid flow from the interior of piston 39 into cylinder 40 but does not permit flow therethrough in a contrary direction.

This piston cylinder assembly will be filled with oil when the piston is in its lower position within the cylinder. When air under pressure is then admitted to the upper end of piston 39 such air pressure will cause the piston to rise with a corresponding flow of oil from the interior thereof into the interior of cylinder 40. Such rise will be reasonably rapid as the oil can pass through check valve 57 in this direction as well as the central orifice in piston head 54 which is partly closed by rod 52. Seal 55 will substantially close such orifice at the start of the upward movement, however, so that there will be a gradual initiation of such movement rather than an abrupt start. When piston 39 has nearly completed its stroke, enlarged portion 53 of rod 52 will enter the central orifice in piston head 54, greatly reducing the rate of flow of oil from the piston into the cylinder. This in effect cushions the final upward movement of the draw frame and avoids a heavy impact between the mold flask and pattern plate.

When drawing the mold, the air pressure will be exhausted from the upper end of piston 39 and such piston and draw frame will descend at the rate permitted by the fluid flow within the piston cylinder assembly. Such rate of flow will at first be slow since the oil cannot pass from cylinder to piston through check valve 57 but only through the central orifice about rod 52. It will be appreciated that the weight of the draw frame and mold, which is considerable, accounts for the downward movement. A slow and even draw is initially obtained until piston head 54 reaches the more slender portion of rod 52, whereupon downward movement of the mechanism becomes rapid. Just before completion of such movement, the upwardly extending portion of seal 55 enters the central orifice in head 54 and the moving portion of the mechanism is brought to a gradual stop.

Since the draw mechanism of this invention above described is located above and to one side of the machine, it keeps relatively clean as compared to mechanisms now in use which are conventionally located directly under the flask in molding position.

A spacer 58 is carried between the lower portions of depending draw frame members 47 and 48 with the upper edge of such spacer positioned to provide a small amount of clearance between it and the lower edge of a flask 11 resting on rollers 49. Such spacer is in the form of a box having neither top nor bottom and conforming in lateral dimensions to such flask 11 and the sand magazine 12. When the draw frame is in elevated position as shown in Figs. 2 and 4, for example, there will ordinarily be just sufficient clearance for the sand magazine 12 to be moved thereunder. It has been found, however, that an appreciable amount of clearance, one-half inch for example, may be provided without having any particular effect on the operation of the machine other than to permit loss of a small amount of sand therethrough. The flask 11 should be adequately vented to permit escape of air therefrom during the molding operation.

The ram

The actual molding operation is performed through action of a ram comprising a piston 59 vertically reciprocable within a cylinder 60. The piston head 61 has a flat upper surface adapted to engage the underside of the false or floating bottom 14 of sand magazine 12 and conforms in shape to such bottom, although of somewhat lesser lateral dimensions. A sheet metal skirt 62 may be provided extending downwardly from such head and adapted to enclose cylinder 60 when the piston is in lowered position, thereby preventing any sand from entering the mechanism.

Piston 59 may desirably be of some light metal such as aluminum alloy and is shown as hollow in its upper portion to further reduce the weight of the same. The lower portion of such piston is provided with a vertically extending transverse slot 63 through which passes a limit pin 64 secured in cylinder 60. Such pin and slot serve as a safety device to limit upward movement of the piston should there be insufficient sand in the magazine or if for any other reason the machine has been improperly adjusted. Such pin also prevents any rotation of the piston. Piston head 61 resting on the upper end of the cylinder serves to limit downward movement of the piston so that the lower piston head 65 will not quite contact the bottom 66 of the short trigger cylinder 67. Piston head 65 is provided with a cup seal 68 to cause such piston head to fit snugly in trigger cylinder 67. The upper end of such short cylinder 67 opens into an air accumulator chamber 69 through the central portion of which piston 59 is adapted to move.

Control system and operation

It is believed that the operation of our new machine may best be understood in connection with the description of the control system, especial reference being had to Figs. 4–6 inclusive of the drawing.

The first operation in the making of a mold is to roll a flask 11 from conveyor 10 into the machine. A retractable stop of conventional design (not shown) may be provided on one of the draw frame members 47 or 48 to ensure proper positioning of the flask on rollers 49 (Fig. 1). The operator now turns draw control valve 70 to admit air under pressure through line 71 to the interior of draw cylinder 39. As above explained, this causes such draw piston to rise carrying with it draw head 44 and flask 11. As such flask is brought into tight engagement with the pattern plate 8, final alignment thereof will be obtained through the conventional pins and bushings (not shown) on such pattern plate and flask. The draw head, flask and spacer 58 will now be in the position shown in Fig. 4.

While the flask is thus being rolled into the machine and brought into engagement with the pattern plate, the sand magazine 12 has been in position beneath hopper 31 as shown in Fig. 1. When the magazine is in this position, the clamshell gate members 32 and 33 will be held open by air cylinder 35. In this position of the sand magazine, four-way control valve 72 has been turned to admit air under pressure to lines 27 and 73. Referring again to Fig. 7, it will be recalled that air pressure in line 27 causes air to be admitted into the right-hand end of cylinder 17 through passage 25, causing such cylinder (and of course cylinder 18) to be shifted to the right as viewed in Fig. 1, carrying magazine 12 under hopper 31.

The air pressure in line 73 is at first ineffective to cause the opening of the clamshell gate of the hopper since three-way spring-returned valve 74 mounted near the end of beam 29 is normally closed and prevents admission of such air pressure to the lower end of cylinder 35 through flexible hose 75. When the sand magazine 12 has nearly completed its travel to the right, however, the upstanding dog 76 mounted on moving cylinder 17 is operative to engage and open valve 74 to admit air under pressure to the lower end of cylinder 35 and thereby cause the opening of clamshell gate members 32 and 33.

With the flask solidly in contact with the pattern plate, the magazine 12 is now brought into position directly beneath such flask preparatory to the ramming operation (Fig. 4 position). This is accomplished by shifting valve 72 to connect lines 73 and 27 to exhaust and to connect lines 26 and 77 to pressure. Piston 36 is moved outwardly from cylinder 35, closing the clamshell gate, and the air pressure in line 26 entering cylinders 17 and 18 through passages 23 causes such cylinders to be returned to the left. The excess of sand extending above the top of the magazine is struck off by strike-off bar 38 as the magazine moves into ramming position. Cushioning valves such as 26a are adapted to be operated by cams on the undersides of moving cylinders 17 and 18 to respectively half close lines 26 and 27 at the start and just before the completion of each reciprocation. This avoids undue jarring of the mechanism.

A high pressure air supply is provided through large conduit 78 to the interior of column 4 on which the control valves are mounted and with which their respective pressure supply lines connect. Such large diameter high pressure conduit 78 also leads to accumulator 69 by way of quick-blow valve 80 and conduit 79. Valve 80 is a three-way valve whereby outlet conduit 79 may ve connected either to air supply conduit 78 or exhaust 81 through movement of spool 82 downwardly by action of compression spring 83 or upwardly through air pressure in pilot line 84 leading from accumulator control valve 85 (see Fig. 6). In this manner a very large volume of air under high pressure may be quickly admitted to the accumulator 69 by operation of the smaller and simpler hand control valve 85. As shown in Fig. 5, valve 85 is a three-way disk type valve operative through rotation of 90° to connect pilot line 84 to pressure (as shown) or to exhaust 86.

A three-way valve 87 is operative to admit air pressure through line 88 to the lower end of trigger cylinder 67. With the sand magazine 12 in position beneath flask 11 and spacer 58 as shown in Figs. 3 and 4, valve 85 is operated to cause high pressure air to be admitted to accumulator 69. Valve 80 is of such large capacity that the filling time is extremely short. As the pressure increases within accumulator 69, a hold-down pressure is built up on piston head 65 on the lower end of the ram piston 59 as such piston head is of somewhat larger diameter than the piston. Three-way valve 87 leading to trigger cylinder 67 is normally open so that any leakage past seal 68 of piston head 65 will not operate to cause the ram piston to ascend. When the accumulator 69 has thus been filled, valve 87 will be operated to admit air under pressure to the lower end of trigger cylinder 67. In view of the much larger area of the lower face of piston head 65 the pressure exerted on the upper surface of such head by the air in the accumulator will be overbalanced and the piston will be caused to ascend at reduced speed. When, however, seal 68 has cleared cylinder 67, the full pressure and volume within accumulator 69 will be available to drive piston 59 upward. Drop in pressure within the accumulator during the rise of the ram piston is minimized by the fact that a further air supply is continuously available through conduit 79 and line 88.

The above-described valve arrangement in combination with the trigger cylinder 67 also constitutes an operational safety feature in that both valves 85 and 87 must be operated in proper sequence if rapid movement of ram piston 59 is to be obtained. Such valves will preferably be spring-returned to exhaust position so that the operator must have one hand on each valve handle to obtain rapid movement of the piston. If valve 87 alone is operated, the piston will rise until head 65 has cleared cylinder 67, but no further, since conduit 79 will still be connected to exhaust through three-way valve 80. If, on the other hand, valve 85 alone is operated, the pressure built up in accumulator 69 will hold down piston 59 rather than elevate it, until trigger valve 87 is turned.

Since line 88 is normally open to atmosphere through valve 87 any leakage from accumulator chamber 69 past seal 68 cannot cause the ram piston to rise. Instead of employing valve 87 and line 88, a bleeder line could be provided from the accumulator chamber to the lower end of trigger cylinder 67. This however would not be quite as safe, as the operator would not know exactly when the ram piston would rise. As above explained, in our preferred arrangement the operator must use both hands simultaneously, one on valve 85 and one on valve 87, before the piston can rise, so that he cannot possibly be in a position of danger.

The accumulator system of our invention may be employed to advantage whenever rapid piston movement is required, but it is desired to avoid use of very high pressures. Such arrangement also permits use of a relatively small and simple hand control valve.

In its upward movement the piston head 61 carries floating bottom 14 and the sand 89 resting thereon toward the pattern 9 within flask 11, spacer 58 serving as a guide chute to confine the sand during its travel from the magazine 12 into the flask. The depth of such spacer is selected to afford a sufficient distance to permit the sand to acquire the desired velocity, to ensure proper ramming action about the pattern.

Such ramming action is accomplished largely by the effect of the velocity thus imparted to the sand and to a lesser extent by the squeezing action afforded by the impact energy built up as a result of the momentum of the ram piston 59 and head 61. By rapidly propelling the sand into the flask as a single unit of predetermined volume advantage is taken of the self-compression of such body of sand when the same collides with the pattern and pattern plate. The result of such action in combination with the impact force provided by the ram piston is to cause the sand to ram uniformly over the contour of the pattern with a lateral as well as forward movement, thereby obtaining an extremely accurate reproduction of the pattern surface. This ramming action is such as to make possible the ramming of shapes and contours not previously achieved with existing jolt squeeze ramming or sand slinger methods. Draw backs may be employed in some instances where previously cores have been required. The body of sand moving as a unit at high velocity contains sufficient air to give it a certain fluidity which is believed to account for the lateral flow characteristics which permit the employment of patterns having undercuts and fine details therein, all surfaces of the resultant mold showing a remarkably uniform and high surface hardness.

The moment the vertical stroke of the ram piston has been completed, valves 85 and 87 are turned to exhaust the accumulator 69, causing piston 59 to return to its "down" position. Floating bottom 14, of course, also drops back into place in the bottom of sand magazine 12 and the sand magazine is returned to filling position as above explained.

Valve 70 is now operated to exhaust the air in draw piston 39, permitting such piston to descend carrying with it the draw frame and flask 11 containing the completed mold. When the draw frame has descended, rollers 49 will again be in line with roller conveyor 10, and the flask and mold will be discharged thereon. Another flask is moved into position on rollers 49 and the operation is ready to be repeated.

While, as described, the machine and method of this invention are particularly adapted to produce molds with the usual foundry molding sands, other materials may be employed in certain instances and articles such as grinding wheels and the like produced instead of sand molds. The claims should accordingly not be understood as limited to the production of foundry molds although this is expected to be the chief use of our invention.

Greatly increased production is possible with our machine due to the fact that all controls are localized, movements are rapid and to a considerable extent simultaneous, and few if any imperfect molds will be formed. The reduction in the number of operations makes the use of automatic controls feasible, particularly as the sand supply means is close-coupled with the machine in contrast to present practise. A definite amount of sand is automatically delivered and spillage much reduced, as a result. The operation of the machine leaves room for very little human error and a remarkable uniformity of finished product is obtained.

By propelling the body of sand upwardly against an inverted pattern, it is possible to obtain a much greater velocity than if the sand were merely dropped into the flask under the influence of gravity. We have found it to be more important to achieve such velocity than to employ a heavy ram piston to provide supplemental impact through the increased momentum of the latter. For this reason such piston will desirably be of light weight and limited diameter, capable of a rapid rate of acceleration. The use of an inverted pattern further greatly facilitates the drawing operation and reduces the likelihood of damage to molds having relatively unsupported upstanding portions which would constitute hanging pockets of sand if such molds were instead inverted. Since the flask is filled and the mold drawn by wholly straight line movement along the same path, such filling is uniform and no damage is done to edges of the completed mold on drawing.

Inspection of the completed mold is furthermore facilitated since it is not required to roll the mold over and the mold is already in position for the setting of cores. The reduced handling of the mold which is necessary not only lessens likelihood of damage thereto but also lessens the chance of injury to the workmen. The machine itself is constructed in a manner making serious injury to the operator nearly impossible, this in contrast to machines now commonly in use.

As above indicated, it is most important that the body of sand be moving at proper speed when it encounters the patern. Such speed must be sufficient to ensure proper conformation of the body of sand to the pattern but should not be so great as to cause unnecessary wear of the latter. In general, we have found that the speed of the body of sand when it encounters the pattern should be on the order of from 15 ft./sec. to 40 ft./sec., and a speed of from 20 ft./sec. to 30 ft./sec. is preferred. A speed of about 25 ft./sec. may be taken as a common standard. For unusual molding operations where the expense of special wear-resisting patterns may be justified considerably higher sand speeds may occasionally be employed.

While considerable clearance may be provided between flask and spacer, and between spacer and sand magazine, it is desirable that the head of the ram piston be relatively close to the false or floating bottom 14 of the magazine so that there will be little initial impact therebetween. The clearance between the other members permits rapid escape of air in addition to the vents in the flask.

The spacer 58 in one machine of our construction is about four inches in depth which provides sufficient free rise in addition to that within the flask for the sand to reach desired velocity. This dimension will, however, vary somewhat depending on the size of the machine and the work to be performed. The spacer is, in effect, the upper portion of the sand magazine and might be dispensed with if a larger magazine were used and the latter only partly filled with sand. It makes for an efficient mechanical construction, however, and avoids the problem of interference with rollers 49. In this same particular machine the ram piston has a stroke of 16 inches. Pistons having a stroke on the order of 20 inches or more are contemplated.

When employing a sand slinger it is necessary first to direct the material into the deeper portions of the pattern and gradually build up the mold. Unless the operator is highly skilled, imperfect molds are likely to result. By contrast, the unit volume of sand projected against the pattern in accordance with our invention has a degree of fluidity imparted thereto which ensures close conformation to all details of such pattern, without the tendency of the first grains to rebound as when projecting the sand in small increments with the sand slinger. The sand slinger also generates a considerable air blast and the operator must wear goggles and gloves for protection from the sand which sprays promiscuously about.

While we have shown one particular form of molding machine embodying the principles of our invention, there are various modifications thereof which may be employed without departing from such principles. Thus, for example, the downwardly facing pattern may be mounted for vertical reciprocation rather than the flask, and the drawing operation performed by elevating such pattern rather than by dropping such flask.

While this invention is primarily concerned with foundry molding, it will be appreciated that instead of employing a flask and pattern in combination some other type of downwardly facing mold cavity may be provided and instead of forming sand molds for foundry use other finished articles such as grinding wheels may be produced. Our new method and apparatus are, of course, adapted to the production of cores as well as foundry molds.

Granular molding materials of non-plastic type such as foundry sand do not flow satisfactorily when merely subjected to a heavy compacting pressure. When a body of such material is placed in motion, on the other hand, such body acquires a very considerable fluidity which enables it to conform to fine pattern details while its mass and velocity provide the desired impact ramming action to obtain a firm structure. Since there is no obstruction between the sand and the pattern, preliminary compacting of such sand prior to entering the mold flask is avoided. The straight-line movement of the fluid body of sand ensures uniformity in all parts of the finished mold surface.

It will be seen that we have provided a velocity-impact squeeze molding machine and method of molding which accomplishes the objects previously set forth.

Other modes of applying the principle of the invention may be employed, change being made as regards the details described, provided the features stated in any of the following claims or the equivalent of such be employed.

We therefore particularly point out and distinctly claim as our invention:

1. A method of molding which comprises the steps of rigidly mounting a pattern facing downwardly, holding a mold flask in subjacent engagement therewith, projecting a body of molding sand sufficient to form the mold upwardly as a unit volume into such flask at high velocity against such pattern, and immediately following such sand with a ram, the upward momentum of which provides a supplemental ramming action.

2. A method of molding which comprises the steps of rigidly mounting a pattern facing downwardly, holding a mold flask in subjacent engagement therewith, projecting a body of sand sufficient to form the mold vertically upwardly as a unit volume into such flask at high velocity against such pattern, such velocity being sufficiently high at the moment of impact of such unit volume of sand against such pattern to develop momentum effective to cause such sand to conform closely to such pattern in a dense coherent body, immediately following such sand with a ram, the upward momentum of which provides a supplemental ramming action, and drawing the mold vertically downwardly from such pattern.

3. A method of molding which comprises the steps of mounting a pattern facing downwardly, holding a mold flask in subjacent engagement therewith, projecting a body of molding sand sufficient to form the mold upwardly as a unit volume into such flask against such pattern at a velocity of from 15 to 40 feet per second, and immediately following such sand with a ram, the upward momentum of which provides a supplemental ramming action.

4. A method of molding which comprises the steps of mounting a pattern facing downwardly, holding a mold flask in subjacent engagement therewith, and projecting a body of molding sand sufficient to form the mold upwardly as a unit volume against such pattern within such flask at a velocity of from 15 to 40 feet per second.

5. A method of molding which comprises the steps of mounting a pattern facing downwardly, holding a mold flask in subjacent engagement therewith, projecting a body of molding sand sufficient to form the mold upwardly as a unit volume into such flask against such pattern at a velocity of from 20 to 30 feet per second, and immediately following such sand with a ram, the upward momentum of which provides a supplemental ramming action.

6. A method of molding which comprises the steps of mounting a pattern facing downwardly, holding a mold flask in subjacent engagement therewith, and projecting a body of molding sand sufficient to form the mold upwardly as a unit volume against such pattern within such flask at a velocity of from 20 to 30 feet per second.

7. A method of molding which comprises the steps of mounting a pattern facing downwardly, holding a mold flask in subjacent engagement therewith, filling a sand magazine with a desired quantity of molding sand, moving such magazine laterally under such flask, projecting the sand in such magazine vertically upwardly as a unit into such flask at high velocity against such pattern, ramming such sand in such flask, withdrawing such magazine, and drawing the flask and mold vertically downwardly from such pattern.

8. In a molding machine, a frame having a head portion, a downwardly facing pattern mounted on the underside of said head, a vertically disposed piston-cylinder assembly mounted below and to one side of said pattern, a draw frame carried by said assembly and adapted to raise and lower a mold flask into and out of subjacent engagement with said pattern, a sand magazine supported by said frame for horizontal reciprocation from a position beneath said pattern and such flask in subjacent engagement therewith to a position laterally thereof, means operative to charge said magazine when thus disposed laterally of said pattern, an upwardly movable bottom in said magazine, a ram cylinder vertically mounted beneath said pattern and below the level of said bottom, a ram piston in said latter cylinder, a large air accumulator chamber at the lower end of said latter cylinder, a short cylinder extending downwardly from the bottom of said chamber in axial alignment with said ram cylinder, a piston head of greater diameter than said ram piston on the lower end thereof adapted to fit in said short cylinder, means adapted to supply air under pressure to said chamber, separately controlled means adapted to supply air under pressure to the lower end of said short cylinder, and a spacer having side walls only carried by said draw frame beneath such flask, said walls being dimensioned similarly to said magazine to permit upward movement therebetween of said magazine bottom by said ram piston.

9. In a molding machine, a frame having a head portion, a downwardly facing pattern mounted on the underside of said head portion, a vertically disposed piston-cylinder assembly mounted below and to one side of said pattern-carrying head, a draw frame carried by said assembly and adapted to raise and lower a mold flask into and out of subjacent engagement with said pattern, a sand magazine mounted for horizontal reciprocation from a position beneath said pattern and such flask in subjacent engagement therewith to a position laterally thereof, means operative to charge said magazine when thus disposed laterally of said pattern, an upwardly movable bottom in said magazine, a spacer having side walls only carried by said draw frame benath such flask, said walls being dimensioned similarly to said magazine to permit vertical movement of said magazine bottom within said spacer, and a vertically disposed ram piston below said pattern and said magazine adapted to engage the underside of said magazine bottom and rapidly elevate the same to project the sand contained in said magazine through said space at high velocity into such flask and against said pattern.

10. In a molding machine, a frame adapted to support a downwardly facing pattern, a draw frame operative to raise and lower a mold flask into and out of subjacent engagement with such pattern, a sand magazine mounted for horizontal reciprocation from a filling station laterally of such pattern to a position vertically beneath such pattern and such flask in subjacent engagement therewith, an upwardly movable bottom in said magazine, a spacer having side walls only carried by said draw frame beneath such flask, said walls being dimensioned to conform to said magazine to permit vertical movement of said magazine bottom within said spacer, and a pneumatically operated vertically reciprocating ram piston below such vertically aligned pattern and magazine adapted to engage the underside of said magazine bottom and rapidly elevate the same to project the sand contained in said magazine through said spacer at high velocity into such flask and against such pattern.

11. In a molding machine, a frame adapted to support a downwardly facing pattern, means operative to hold a mold flask in subjacent engagement with such pattern, a sand magazine adapted to be positioned beneath such flask, an upwardly movable bottom in said magazine, a spacer having side walls only between said magazine and such flask, and a pneumatically operated vertically disposed ram piston below said magazine adapted rapidly to elevate said magazine bottom to project the sand contained in said magazine into such flask and against such pattern.

12. In a molding machine, a frame, a downwardly facing pattern, supported by said frame, means operative to hold a mold flask in subjacent engagement with such pattern, a sand magazine beneath such flask and pattern, an upwardly movable bottom in said magazine, a vertically disposed piston below said bottom adapted rapidly to elevate the latter to project the sand contained in said magazine into such flask and against said pattern and means operative explosively to impel said piston upwardly at high initial velocity and with rapid acceleration thereof.

13. A method of molding which comprises moving a ram to project a body of a granular non-plastic molding medium sufficient to fill a mold cavity into such cavity at a velocity of at least fifteen feet per second as a unit volume, and further compacting such molding medium therein through pressure exerted by the momentum of such immediately following ram.

14. In a molding machine, a frame, downwardly facing pattern, supported by said frame, means operative to hold a mold flask in subjacent engagement with said pattern, a sand magazine adapted to be positioned beneath such flask, an upwardly movable bottom in said magazine, a ram cylinder vertically mounted below said bottom, a large air accumulator chamber at the lower end of said cylinder into which said cylinder opens, a short cylinder extending downwardly from the bottom of said chamber in axial alignment with said ram cylinder, a ram piston reciprocable in said ram cylinder and adapted to elevate said sand magazine bottom, a piston head of greater diameter than said piston on the lower end thereof adapted to enter said short cylinder, means adapted to supply air under pressure to said chamber, and separately controlled means adapted to supply air under pressure to the lower end of said short cylinder, whereby air pressure in said chamber acting on said piston head tends to hold the latter in said short cylinder until overbalanced by air pressure admitted to the lower end of said short cylinder.

15. In a molding machine, a frame, a mold supported by said frame, means adapted to support a supply of granular non-plastic molding medium in position to be projected into said mold, and means adapted to project such body of molding medium into said mold comprising a ram cylinder, a ram piston reciprocable in said cylinder and adapted to engage and project such body of molding medium, an air accumulator chamber into which said cylinder opens, and means adapted releasably to hold said piston against movement in said cylinder by air pressure in said chamber.

16. A method of molding which comprises the steps of projecting a unit volume of a granular non-plastic molding medium upwardly in an unobstructed straight-line path into a downwardly opening mold cavity from a point outside such cavity and substantially spaced therebelow, at a velocity sufficiently high at the moment of impact of such medium against such mold to render the same fluid and to develop momentum effective to conform and compact such medium closely against such mold in a dense coherent body, such unit volume being sufficient to form the entire molded article, then forcibly ramming the medium in such mold immediately following such impact thereagainst while such sand is still fluid, and then separating such molded article from such mold.

17. A method of molding which comprises supporting a body of granular non-plastic molding medium on an imperforate support below and spaced from a downwardly opening mold cavity, striking such support a violent blow effective to project such entire body as a unit volume into such mold cavity at a velocity sufficiently high at the moment of impact of such medium against such mold to render the same fluid and to develop momentum effective to conform and compact such medium closely against such mold in a dense coherent body, such body travelling in an unobstructed straight-line path directly into such cavity, such unit volume being sufficient to form the entire molded article, and then separating such molded article from such mold.

18. In a molding machine having a downwardly open mold cavity, a magazine including a bottom board adapted to support a body of granular non-plastic molding medium sufficient to form the entire article to be molded below said mold cavity, and impact power means operative explosively to impel said bottom board upwardly to project such body of molding medium as a unit volume from the magazine and into said mold cavity at high velocity.

LEON F. MILLER.
LYNDON C. COLE.

(References on following page)

REFERENCES CITED

The following references are of record in the file of this patent:

UNITED STATES PATENTS

| Number | Name | Date |
|---|---|---|
| 593,267 | Adams | Nov. 9, 1897 |
| 1,091,020 | Ronceray | Mar. 24, 1914 |
| 1,134,398 | McCarte | Apr. 6, 1915 |
| 1,291,996 | Michele | Jan. 21, 1919 |
| 1,480,748 | Demmler | Jan. 15, 1924 |
| 1,492,355 | Campbell | Apr. 29, 1924 |
| 1,593,035 | Rathbone | July 20, 1926 |
| 1,597,322 | McCabe | Aug. 24, 1926 |
| 1,923,237 | Stahn | Aug. 22, 1933 |
| 1,931,902 | Oyster | Oct. 24, 1933 |
| 2,169,279 | Oyster | Aug. 15, 1939 |
| 2,327,241 | Berger | Aug. 17, 1943 |
| 2,349,219 | Wood | May 16, 1944 |
| 2,449,136 | Pattison | Sept. 14, 1948 |
| 2,456,689 | Eastman | Dec. 21, 1948 |

FOREIGN PATENTS

| Number | Country | Date |
|---|---|---|
| 6,844 | Great Britain | 1893 |
| 277,183 | Germany | Aug. 10, 1914 |